United States Patent
Zeng et al.

(10) Patent No.: US 10,172,149 B2
(45) Date of Patent: Jan. 1, 2019

(54) UPLINK RESOURCE SCHEDULING METHOD, TERMINAL AND BASE STATION

(71) Applicant: SHANGHAI RESEARCH CENTER FOR WIRELESS COMMUNICATIONS, Shanghai (CN)

(72) Inventors: Yu Zeng, Shanghai (CN); Yuanping Zhu, Shanghai (CN); Ting Zhou, Shanghai (CN); Yang Yang, Shanghai (CN); Honglin Hu, Shanghai (CN); Haifeng Wang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 83 days.

(21) Appl. No.: 15/165,796

(22) Filed: May 26, 2016

(65) Prior Publication Data
US 2017/0196018 A1 Jul. 6, 2017

(30) Foreign Application Priority Data
Dec. 31, 2015 (CN) .......................... 2015 1 1031556

(51) Int. Cl.
| H04W 4/00 | (2018.01) |
| H04W 72/12 | (2009.01) |
| H04W 72/04 | (2009.01) |
| H04W 88/06 | (2009.01) |
| H04W 84/12 | (2009.01) |

(52) U.S. Cl.
CPC ..... *H04W 72/1252* (2013.01); *H04W 72/042* (2013.01); *H04W 72/0413* (2013.01); *H04W 72/0426* (2013.01); *H04W 84/12* (2013.01); *H04W 88/06* (2013.01)

(58) Field of Classification Search
None
See application file for complete search history.

(56) References Cited

U.S. PATENT DOCUMENTS

| 2015/0098322 A1* | 4/2015 | Chen ................. H04W 72/0413 370/230 |
| 2015/0245349 A1* | 8/2015 | Jha .................... H04W 28/0205 370/329 |
| 2015/0271836 A1* | 9/2015 | Damnjanovic et al. ..................... H04W 72/0413 370/329 |
| 2015/0334737 A1* | 11/2015 | Susitaival ......... H04W 72/1284 370/329 |
| 2016/0057800 A1* | 2/2016 | Ingale ............... H04W 56/0005 370/216 |
| 2016/0105882 A1* | 4/2016 | Park ....................... H04B 7/024 370/329 |

\* cited by examiner

*Primary Examiner* — Phirin Sam
(74) *Attorney, Agent, or Firm* — Kirton McConkie; Evan R. Witt (57) ABSTRACT

The present invention discloses an uplink resource scheduling method, and also discloses a corresponding terminal and base station. In the method, a base station calculates an uplink resource required to grant to a terminal by a base station according to a split bearer data ratio, and then performs uplink resource grant.

16 Claims, 6 Drawing Sheets

| Cache data size 0 | Cache data size 1 | First byte |

| Field | Field | Label |
|---|---|---|
| Cache data size 0 | Cache data size 1 | First byte |
| Cache data size 1 | Cache data size 2 | Second byte |
| Cache data size 2 | Cache data size 3 | Third byte |
| Cache data size 3 | Split bearer data ratio | Fourth byte |

FIG. 6(a)

| Field | Field | Label |
|---|---|---|
| Cache data size 0 | Split bearer data ratio 0 | First byte |
| Cache data size 1 | Split bearer data ratio 1 | Second byte |
| Cache data size 2 | Split bearer data ratio 2 | Third byte |
| Cache data size 3 | Split bearer data ratio 3 | Fourth byte |

UPLINK RESOURCE SCHEDULING METHOD, TERMINAL AND BASE STATION

BACKGROUND

Technical Field

The present invention relates to an uplink resource scheduling method, and also relates to a corresponding terminal and base station, belonging to the technical field of wireless communication.

Related Art

In an LTE network, scheduling of an uplink is performed based on a Buffer Status Report (BSR) of UE, namely, the UE sends a BSR to an eNB and notifies the eNB of a data size in an uplink buffer, to facilitate the eNB to allocate how much uplink resource to the UE in an UL grant. A user establishes massive Radio Bearers on an idle port for services of different types, and each radio bearer corresponds to one Logical Channel (LC). In order to reduce uplink report overhead, the LTE introduces the concept of a Logic Channel Group (LCG), and places each logic channel with data to be transmitted into one LCG. The logic channels in the same LCG generally have close priorities. The UE reports the BSR to the eNb based on the LCG other than reporting one BSR for each logic channel (bearer).

In an LTE and WLAN aggregation scene, the radio bearer of the UE can be divided into two types: one type of bearer which can transmit data through both the LTE and WLAN at the same time and called as a split bearer; and the other type of bearer which transmits data by only the LTE chain and called as a non-split bearer. For a service transmitted only through the WLAN chain, there is no need of establishment of the radio bearer. Similarly, in an LTE dual connectivity scene, bearers of the UE are also divided into a split bearer and a non-split bearer, data corresponding to the split bearer can be transmitted by a Master eNB (MeNB) and a Secondary eNB (SeNB), while the non-split bearer can be divided into an MCG bearer (a corresponding service base station is the master base station) and an SCG bearer (a corresponding service base station is the secondary base station) according to an oriented service base station.

Figure 1:
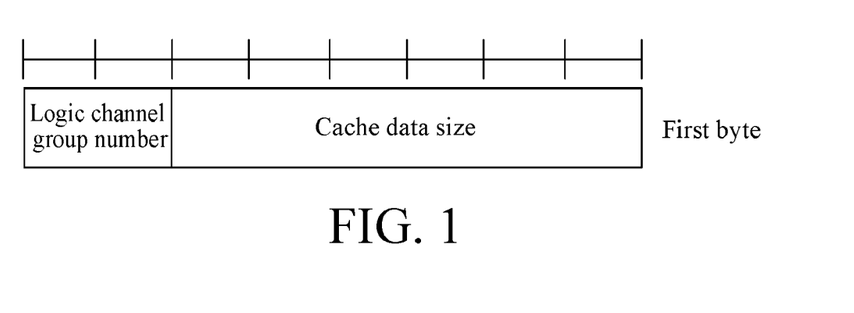
FIG. 1 is a schematic diagram of a short BSR format in prior art.
Figure 2:
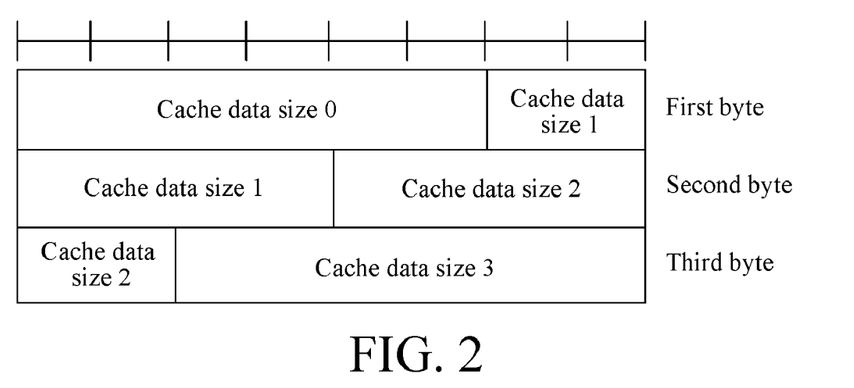
FIG. 2 is a schematic diagram of a long BSR format in prior art.

According to a current LTE standard, the BSR is divided into a short BSR (Short BSR) and a long BSR (Long BSR). Short BSR denotes a data size of one LCG and its format is as shown in FIG. 1. Long BSR denotes a data size of four LCG and has a format as shown in FIG. 2. In an existing BSR structure, since the UE reports a buffer status based on the LCG, if certain LCG contains both the split bearer and the non-split bearer. Therefore, a BSR report manner in the existing standard is followed, in the LTE and WLAN aggregation scene, the eNB cannot judge the data size that can be transmitted by the WLAN chain, so that uplink resource allocation can still performed according to a request of the UE, leading to excessive resource allocated to the UE and resource waste. If the eNB estimates a service capacity of the WLAN chain according to an interaction AP service rate, and then subtracts the data size transmitted in the WLAN chain by the BSR of the UE, which possibly causes insufficient resource allocated to the UE. Similarly, in the LTE dual connectivity scene, MeNB and SeNB possibly cannot judge the data size corresponding to the split bearers in the BSR fed back by the UE and further cannot judge a reasonable scheduling decision.

3GPP performs extension on a metric of the BSR in Release-10 and extends an original upper limit to 30000 bytes from 15000 bytes, each LCG is still denoted by 6 bytes and a corresponding BSR precision drops.

Therefore, in a scene that the UE with a Multi-connection function is connected to a plurality of networks or cells to receive service (cellular network and WLAN network aggregation and LTE dual connectivity), how to fully use usable network resource and how to provide a proper resource scheduling strategy for user uplink transmission have important meanings for enhance an effective use rate of the resource.

SUMMARY

The present invention aims to solve a primary technical problem about providing an uplink resource scheduling method and a corresponding buffer status reporting method.

The present invention aims to solve another technical problem about providing a terminal for uplink resource scheduling.

The present invention aims to solve further technical problem about providing a base station for realizing uplink resource scheduling.

For realizing the objects of the present invention, the present invention adopts a following technical solution:

An uplink resource scheduling method comprises following steps:

calculating an uplink resource required to grant to a terminal by a base station according to a split bearer data ratio, and then performing uplink resource grant.

More preferably, the split bearer data ratio is a ratio of a split bearer data size to a total data size to be transmitted.

More preferably, the split bearer data ratio is a ratio of a split bearer data size of each logic channel group to a total data size of the logic channel group.

More preferably, the base station calculates uplink resource required to grant to the terminal according to the split bearer data ratio and a split bearer data allocation ratio.

More preferably, the split bearer data allocation ratio is determined by negotiation between the base station and a node capable of transmitting the split bearer data size and should be the ratio of the split bearer data size transmitted by the base station to the split bearer data.

More preferably, the uplink resource required to grant to the terminal calculated by the base station is a non-split bearer data size that should be transmitted by the base station plus a product of the split bearer data size and the split bearer data allocation ratio.

More preferably, the split bearer data size should be transmitted by the node capable of transmitting the split bearer data size, is attained by subtracting the split bearer data size transmitted by the base station from the split bearer data size.

More preferably, the base station calculates the uplink resource required to grant to the terminal according to the split bearer data ratio and a WLAN access point service rate.

More preferably, the uplink resource required to grant to the terminal and calculated by the base station is the total data size to be transmitted subtracting a data size capable of being transmitted by WLAN, wherein the data size capable of being transmitted by WLAN is smaller than a product of the total data size to be transmitted and the split bearer data ratio.

More preferably, the uplink resource required to grant to the terminal and calculated by the base station is a non-split bearer data in the total data size to be transmitted, wherein the data size capable of being transmitted by WLAN is larger than or equal to a product of the total data size to be transmitted and the split bearer data ratio.

An uplink buffer status reporting method comprises following steps:

when the terminal reports a buffer status report to the base station, the buffer status report comprises a split bearer data ratio.

More preferably, the split bearer data ratio contained in the buffer status report is a split bearer data ratio corresponding to a logic channel group.

More preferably, the split bearer data ratio is a ratio of a split bearer data size to a total data size to be transmitted.

More preferably, the split bearer data ratio is a ratio of a split bearer data size to a total data size of each logic channel group in the logic channel group.

A terminal for uplink resource scheduling is characterized in that when the terminal reports a buffer status report to the base station, the buffer status report comprises a split bearer data ratio.

A base station for uplink resource scheduling is characterized in that the base station calculates an uplink resource required to grant to a terminal according to a split bearer data ratio, and then performs uplink resource grant, wherein, the split bearer data ratio is a ratio of a split bearer data size to a total data size to be transmitted, or, the split bearer data ratio is a ratio of a split bearer data size to a total data size of each logic channel group in the logic channel group.

In the technical solution according to the present invention, the base station can obtain the split bearer data ratio and the split bearer data allocation ratio. Hence, the base station can calculate the split bearer data size in the total data size to be transmitted according to the split bearer data ratio. The base station can calculate, according to the split bearer data allocation ratio, the split bearer data size that should be transmitted by the base station in the split bearer data size. Thus, the data size should be transmitted by the base station is the non-split bearer data size plus the split bearer data size that should be transmitted by the base station. Therefore, the present invention can be used for precisely calculating the uplink resource required to grant to the terminal by the base station, thus improving a resource use ratio.

BRIEF DESCRIPTION OF THE DRAWINGS

FIG. 6($a$) is a schematic diagram of a first long BSR in the present invention;

FIG. 6($b$) is a schematic diagram of a second long BSR in the present invention;

DETAILED DESCRIPTION

Technical content of the present invention is specifically described in detail in combination with the drawings and specific embodiments.

The present invention is suitable for both a cellular network and Wireless Local Access Network (WLAN) aggregation (LTE-WLAN Aggregation short for LWA) heterogeneous network and an LTE dual connectivity scene. The present invention provides that in a network aggregation scene, an uplink buffer status report sent to an evolved NodeB (eNB) from User Equipment (UE) maintaining multiple pieces of connections contains a ratio of data corresponding to Split bearer to total buffer status data, to facilitate that the eNB reasonably performs uplink resource scheduling on the UE.

For the purpose that in a scene the UE with a Multi-connection function is connected to a plurality of networks or cells to receive service (cellular network and WLAN network aggregation and LTE dual connectivity), the cellular base station eNB can reasonably schedule uplink resource for the UE, the present invention provides: a BSR sent to the cellular eNB from the UE should contain a ratio of data corresponding to the split bearer besides the data size of each LCG. The ratio of data corresponding to the split bearer comprises two following conditions: 1, the ratio of the data corresponding split bearer in each LCG to the total data size of the LCG, that is, four LCGs have four ratios; and 2, the total data size corresponding to the split bearers in the four LCGs to the total data size of the four LCGs.

In addition, due to the need of byte aligning, a part of idle redundant bytes is possibly introduced by adding the ratio of the data corresponding to the split bearer to the BSR. For example, if the ratio of the data size corresponding to the split bearer is denoted by 4 bits, then one complete byte has four idle bits. In order to adapt to the surge of a wireless service burst data size and fully use the idle redundant bits, the present invention further provides that in spare time of increasing the ratio of the data size corresponding to the split bearer to the BSR, the idle redundant bits are used for extending an existing BSR measuring range or enhancing the existing BSR data representation precision.

In the cellular network and WLAN aggregation scene, after the eNB receives the BSR, it can be known that in the uplink data to be transmitted, the UE can use the LTE and WLAN to transmit the data size corresponding to the split bearer and the data size corresponding to the non-split bearer. Further, a reasonable judgment can be made in combination with a service capacity of a WLAN AP to the corresponding UE, the uplink resource is allocated to the rest part after the uplink data to be transmitted of the UE subtracts the data size capable of being transmitted by the WLAN chain and uplink grant is sent to the UE. The data size on which the eNB should perform uplink grant can refer to two following mode for calculation:

First mode: the eNB estimates time t from the moment of receiving the BSR of the UE to the moment that the UE finishes the uplink transmission according to the uplink resource grant, and combines the WLAN AP's uplink service rate r for the UE, a data size known from the BSR and required to be transmitted by uplink of the UE and a split bearer data size ratio P to calculate a data size G required by the UE for uplink resource grant, wherein G is calculated by a following formula:

$$G = \begin{cases} D \times (1-P), & \text{if } D \times P \le r \times t \\ D - r \times t, & \text{if } D \times P > r \times t \end{cases}$$

Second mode: allocation ratios of the split carrier data negotiated by the eNB and the WLAN AP through an Xw interface at the cellular chain and the WLAN chain are respectively $\lambda_{cellular}$ and $\lambda_{cellular}$, and $\lambda_{cellular}+\lambda_{WLAN}=1$, then the data size G required by the UE for uplink resource grant can be calculated by a following formula:

$$G=D\times(1-P)+D\times P\times\lambda_{cellular}$$

In the LTE dual connectivity scene, according to the report result of the BSR, the MeNB and SeNB know the data size S corresponding to the split bearer serviced by the MeNB and the SeNB in the uplink data to be transmitted of the UE, and respective corresponding non-split data $N_M$ and $N_S$, then the MeNB and the SeNB can determine that allocation ratios of the split bearer data are respectively $\lambda_M$ and $\lambda_S$ ($\lambda_M+\lambda_S=1$) according to negotiation of the two, and perform the uplink transmission resource grant for UE according to $N_M+\lambda_M S$ and $N_S+\lambda_S S$.

Embodiment 1

The uplink resource scheduling scene of the cellular network and WLAN aggregation scene is taken as an example for describing the uplink buffer status reporting method according to the present invention.

Figure 3:
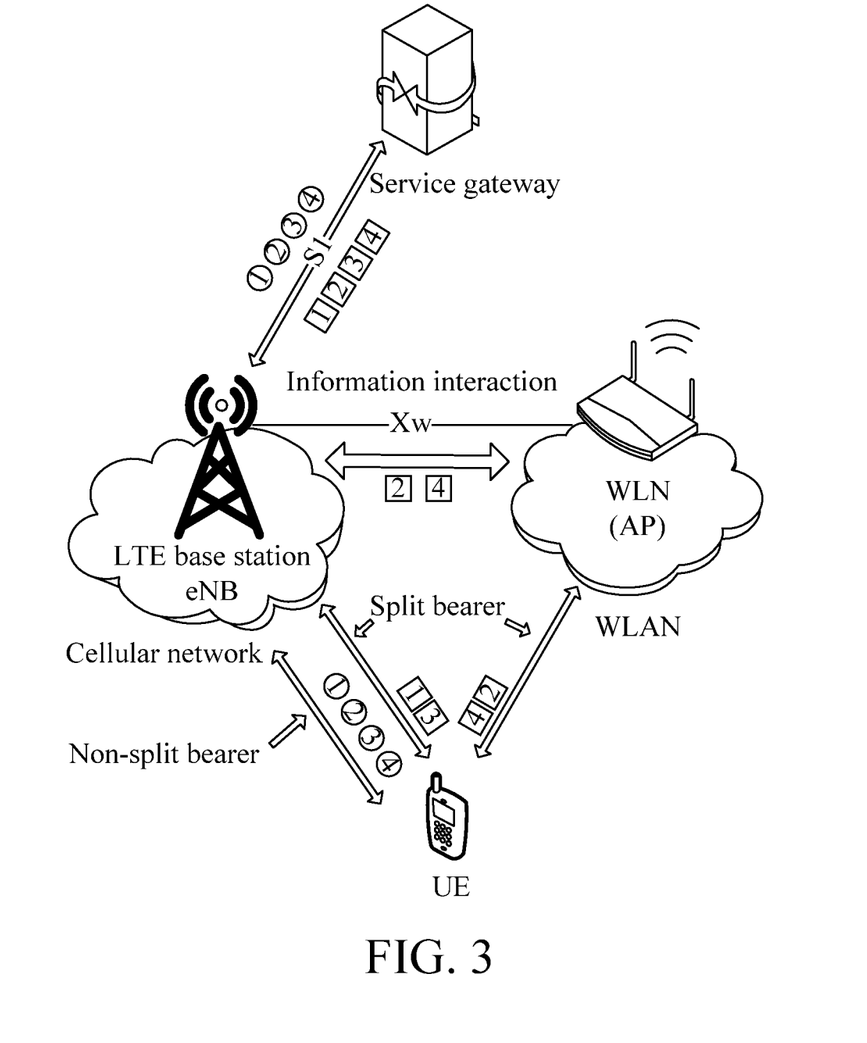
FIG. 3 is a schematic diagram of a cellular network and WLAN aggregation networking uplink scene in a first embodiment according to the present invention.

As shown in FIG. 3, in the cellular network and WLAN aggregation heterogeneous network, the WLAN Access Point (AP) provides a WiFi access service in certain range, and a cellular base station provides a cellular network access service. The cellular network base station and the WLAN logic node (WLN) are connected by the Xw interface. The WLN can be positioned in the WLAN AP and an access controller (AC) or can be an independent logic entity, a communication interface between the WLN and the cellular network base station and can perform UE data forwarding and signaling interaction. In the present embodiment, the WLN is positioned at the WLAN AP. The UE has a Multi-RAT capacity, namely can keep the connection between the WLAN and the cellular network. A bearer between the UE and the network has a split bearer type and a non-split bearer type, wherein data corresponding to the split bearer is transmitted by the LTE and WLAN chains, and the data corresponding to the non-split bearer is transmitted by the LET chain. Each bearer corresponds to one logic channel, and a plurality of logic channels are mapped into four LCGs according to certain rule.

Assuming that four LCGs of the UE are and respectively $LCG_0$, $LCG_1$, $LCG_2$ and $LCG_3$, corresponding uplink data sizes to be transmitted are respectively, $D_0$, $D_1$, $D_2$ and $D_3$, and corresponding data size ratios of the split bearers contained in all LCGs are respectively $P_0$, $P_1$, $P_2$ and $P_3$ The total data size to be transmitted of the four LCGs (the total data size to be transmitted) is D, and a ratio of the sum of the data size corresponding to the split bearer to the total data size D to be transmitted is P.

The total data size to be transmitted is the total data size of all logic channel groups contained in the buffer status report of the terminal. For example, in the LTE dual connectivity scene, for the MeNB, the total uplink data size to be transmitted of the UE is the sum of the data size of the corresponding logic channels of all MCG bearers and the data size of the corresponding logic channels of the split bearers contained in the BSR; for the SeNB, the total uplink data size to be transmitted of the UE is the sum of the data size of the corresponding logic channels of all SCG bearers and the data size of the corresponding logic channels of the split bearers contained in the BSR, For another example, in the LWA scene, for the cellular base station eNB, the total uplink data size to be transmitted of the UE is the sum of the data size of the corresponding logic channels of all non-split bearers and the data size of the corresponding logic channels of all split bearers contained in the BSR.

Figure 4:
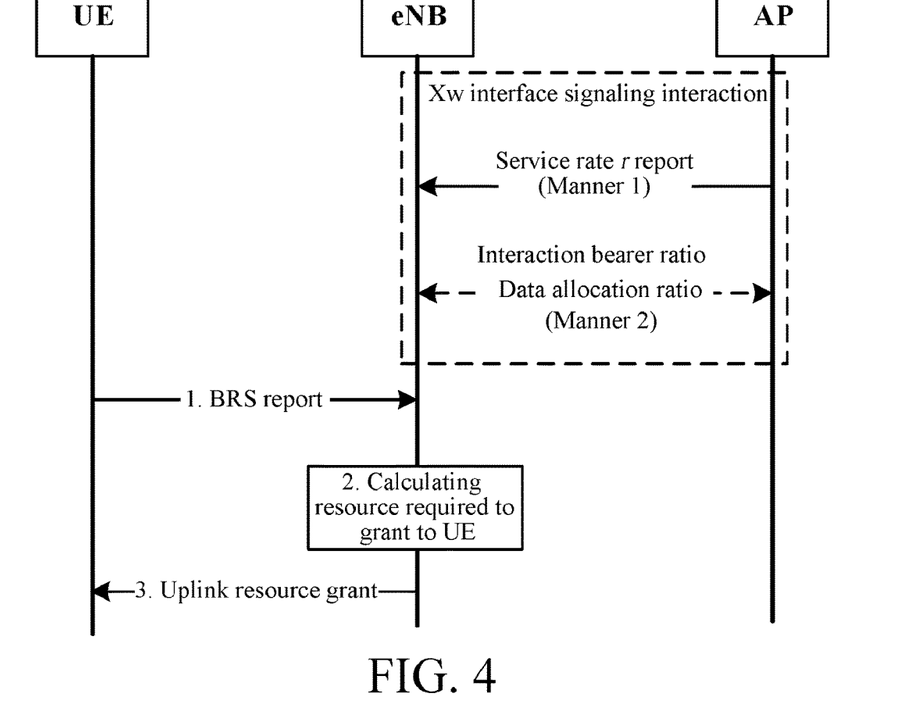
FIG. 4 is a schematic diagram of an uplink resource scheduling flow in the first embodiment according to the present invention.

The UE uplink scheduling flow corresponding to the present embodiment is as shown in FIG. 4. The cellular base station eNB and the WLAN AP perform signaling interaction by the Xw interface to determine a parameter of transmission split bearer data of the WLAN. In the first mode, the parameter of the transmission split bearer data of the WLAN is a service rate r reported by the WLAN AP. The cellular base station can calculate the split bearer data size capable of being transmitted by the WLAN according to the service rate r and the time required for transmitting the total data size to be transmitted. In the second mode, the parameter of the transmission split bearer data of the WLAN is a split bearer data allocation ratio, and accordingly, the cellular base station can calculate the split bearer data size capable of being transmitted by the WLAN. Detailed description is as follows:

Step 1: sending a BSR report to a cellular base station by a terminal

Figure 5:
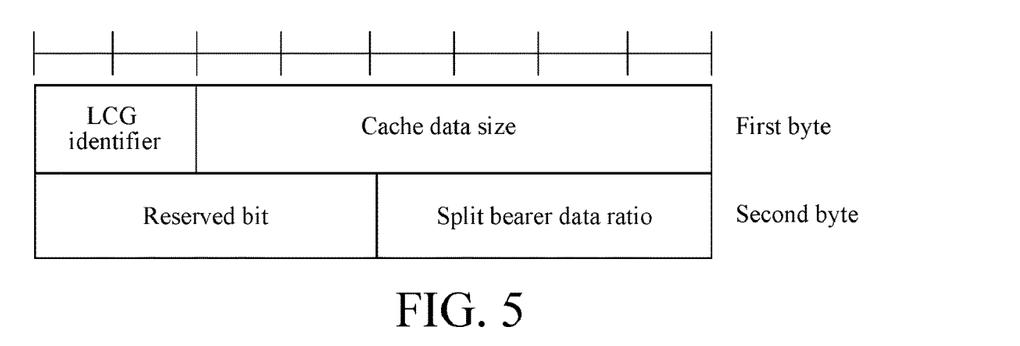
FIG. 5 is a schematic diagram of a short BSR structure in the present invention.

In order to request the reasonable uplink scheduling resource from the eNB, the UE sends the BSR to the cellular base station eNB. The BSR can adopt one of following three formats:

First format: as shown in FIG. 5, the UE adopts the novel short BSR manner according to the present invention to report a buffer status of a single LCG. The short BSR format comprises an LCG identifier, a buffer data size, a split bearer data ratio and a reserved bit, wherein the LCG identifier length is 2 bits and used for designating the reported LCG corresponding to the BSR; the split bearer data ratio can be identified with n bits and used for indicating an approximate range of a ratio Pi of the split bearer corresponding data size in the data to be transmitted corresponding to the $LCG_i$ (i=0, 1, 2, 3) to the data to be transmitted of the $LCG_i$. In the present embodiment, n=4.

The buffer data size is used for indicating an approximate range of the data size Di to be transmitted of the LCGi; the reserved bits have m bits and are used for extending a field of the buffer data size to identify a larger and more data size range. Generally, from a demand of byte aligning, (m+n) mod 8=0. For example, in the present embodiment, m=4, if two bits therein are used for extending the field of the buffer data size, then the buffer data size is identified by 8 bits.

Figure 6A:
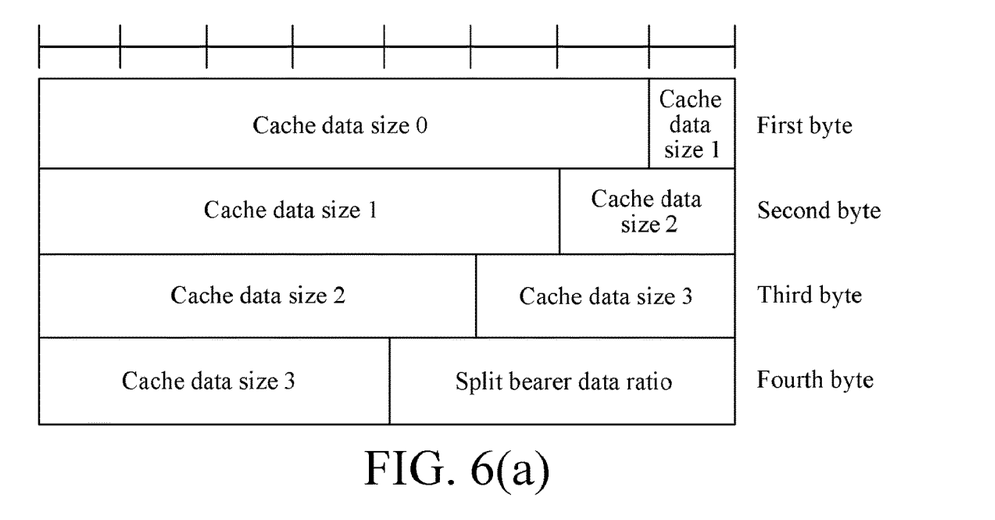

Second format: as shown in FIG. 6(a), the UE can report the data size of four LCGs according to the novel BSR manner according to the present invention. The long BSR format comprises buffer data sizes 0-3 and a split bearer data ratio, wherein the buffer data sizes 0-3 respectively represent a range of the data sizes $D_0$-$D_3$ to be uploaded of the $LCG_0$-$LCG_3$, and are respectively represented by 6+x bits. The split bearer data ration is n bits and is used for indicating an approximate range of a ratio P of a sum of the split bearer transmission data in the four LCGs (the sum of all split bearer data to be transmitted in the buffer data 0-3) to the total data size D of the four LCGs, wherein x bits are idle bits required for byte aligning and used for extending a buffer data size field and meet (4x+n) mod 8=0. In the present embodiment, x=1 and n=4.

Figure 6B:
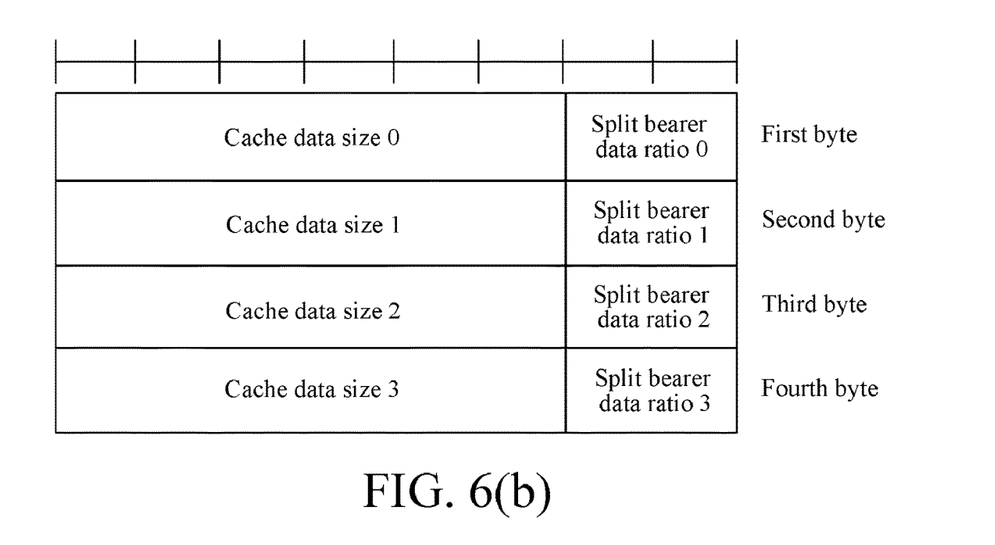

Third format: as shown in FIG. 6(b), the UE can further adopt another BSR mode according to the present invention to report the data size of the four LCGs. The long BSR format comprises buffer data sizes 0-3 and split bearer data ratios 0-3, That is, each buffer data size corresponds to one split bearer data ratio.

The buffer data sizes 0-3 respectively represent ranges of data sizes $D_0$-$D_3$ to be uploaded of the $LCG_0$-$LCG_3$ and are represented by 6+x bits. The split bearer data ratios 0-3 respectively represent a ratio of the split bearer data to be transmitted in one LCG to the LCG buffer data size, that is, an approximate range of ratios $P_0$-$P_3$ of the split bearer data to be transmitted in the $LCG_0$-$LCG_3$ to the data size to be transmitted D. Each ratio is represented by y bits, wherein x bits are idle bits required for byte aligning and used for extending a buffer data size field and meet (x+y) mod 2=0. In the present embodiment, x=0 and y=2.

Step 2: calculating the uplink resource required to grant to terminal by the base station In the uplink buffer status report method according to the present invention, after receiving the BSR sent from the UE, the eNB can obtain the total data size to be transmitted D of the four LCGs and a split bearer data size ratio P. In addition, the eNB can approximately estimates the time t from the moment of receiving the BSR of the UE to the moment that the UE finishes the uplink transmission according to the uplink resource grant. The eNB can calculate the data size required for the UE to perform uplink resource grant referring to following manners:

Manner 1: the cellular base station eNB obtains the service rate r of the WLAN AP to the UE by the signaling interaction of the Xw interface and the data size G required for the UE to perform uplink resource grant by the cellular base station eNB is calculated by the following formula:

$$G = \begin{cases} D \times (1-P), & \text{if } D \times P \leq r \times t \\ D - r \times t, & \text{if } D \times P > r \times t \end{cases} \quad (1)$$

Formula (1) represents that when the split bearer data size (D*P) is smaller than or equal to the data size (r*t) capable of being transmitted by the WLAN, it is indicated that all split bearer data size can be transmitted by the WLAN, therefore, the uplink resource required to grant by the cellular base station is the non-split bearer data size transmitted by the cellular base station, namely, D*(1-P). When the split bearer data size (D*P) is larger than the data size (r*t) capable of being transmitted by the WLAN, it is indicated that the WLAN cannot realize transmission of all split bearer data size and the cellular base station is required to transmit part of split bearer data size. Therefore, the uplink resource required to grant by the cellular base station is the total data size D to be transmitted subtracting the data size capable of being transmitted by the UE in the WLAN chain.

Manner 2: the cellular base station eNB and the WLAN AP negotiate through the Xw interface, the allocation ratios of the split bearer data in the cellular chain and the WLAN chain are respectively $\lambda_{cellular}$ and $\lambda_{WLAN}$, and $\lambda_{cellular} + \lambda_{WLAN} = 1$, then the data size G required by the cellular base station to perform uplink resource grant for the UE is calculated by following format:

$$G = D \times (1-P) + D \times P \times \lambda_{cellular} \quad (2)$$

Formula (2) indicates that the data size G of the cellular base station performing uplink resource grant for the UE must be the non-split bearer data size transmitted by the cellular base station, namely, D*(1-P) plus the data size that should be transmitted by the cellular base station according to the negotiated ratio $\lambda_{cellular}$ in the split bearer data size (D*P), namely $D \times P \times \lambda_{cellular}$.

Step 3: performing uplink resource grant on the terminal by the base station

According to the data size G required by the cellular base station for performing uplink resource grant on the UE calculated in step (2), the base station performs uplink transmission resource grant on the terminal.

The uplink resource scheduling method according to the present invention can use the cellular base station eNB to reasonably schedule uplink resource for the UE, and does not waste the uplink resource and increase an excessive signaling overhead, and effectively improves a resource use rate.

Embodiment 2

The present embodiment discusses an uplink resource scheduling flow of an LTE dual connectivity scene. Only the difference from the first embodiment is described herein and same parts are not repeated.

Figure 7:
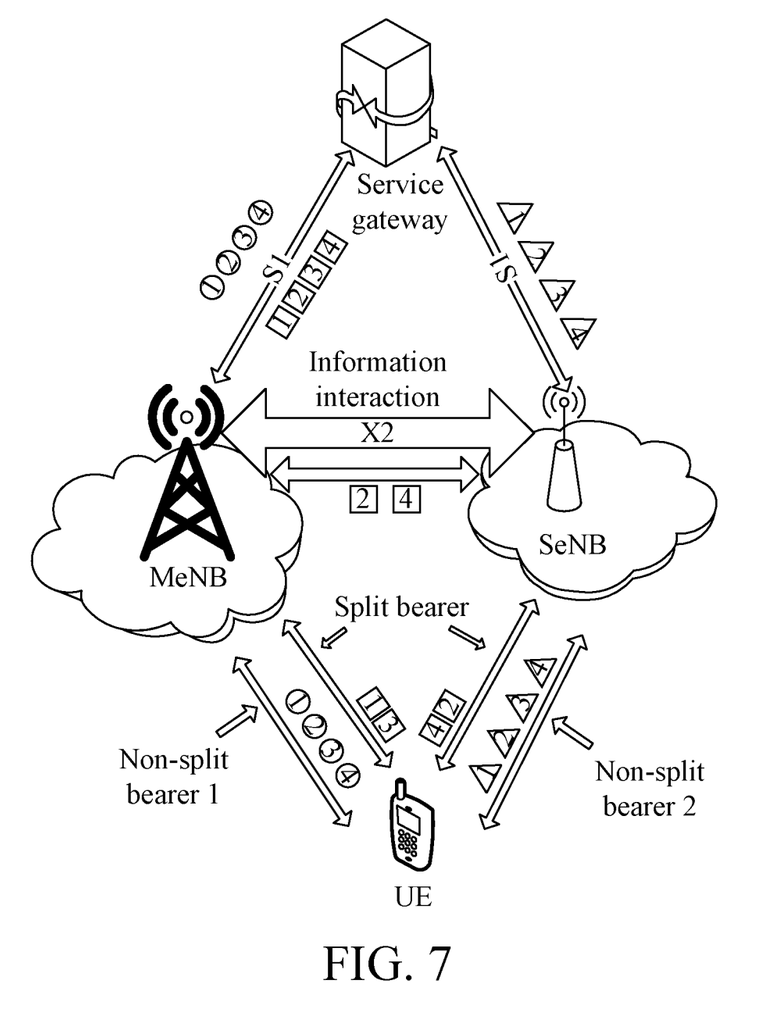
FIG. 7 is a schematic diagram of an LTE dual connectivity uplink resource scheduling scene in a second embodiment according to the present invention.

As shown in FIG. 7, in the present embodiment, an LTE dual connectivity scene diagram is similar to a cellular network and WLAN aggregation scene, the control node MeNB and the forwarding node SeNB are connected by an X2 interface, and the terminal UE can maintain and control the connection between the control node MeNB and the forwarding node SeNB and supports transmission of split bearer data and non-split bearer data. A dual connectivity bearer between the terminal UE and the MeNB and the SeNB is called as a split bearer, the non-splint bearer between the terminal UE and the MeNB is called as an MCG bearer and the non-splint bearer between the terminal UE and the SeNB is called as an SCG bearer.

In the present embodiment, the BSR report format adopted by the UE can refer to the embodiment 1. The only difference is in the LTE dual connectivity scene, and the UE can report the BSR to the control node MeNB and the forwarding node SeNB. In such case, the BSR reported to the control node MeNB by the UE contains the non-split bearer data size and split bearer data size corresponding to the MCG bearer, and the BSR reported to the control node SeNB by the UE contains the non-split bearer data size and split bearer data size corresponding to the SCG bearer. It is noticeable that in some cases, for example, the data size corresponding to some split carriers is smaller than a given threshold value, the data size corresponding to the split carrier possibly reports to one of the two base station (MeNB and SeNB), and in such case, the data size of the split bearer is included in the non-split bearer of the corresponding base station (MCG bearer or SCG bearer).

Figure 8:
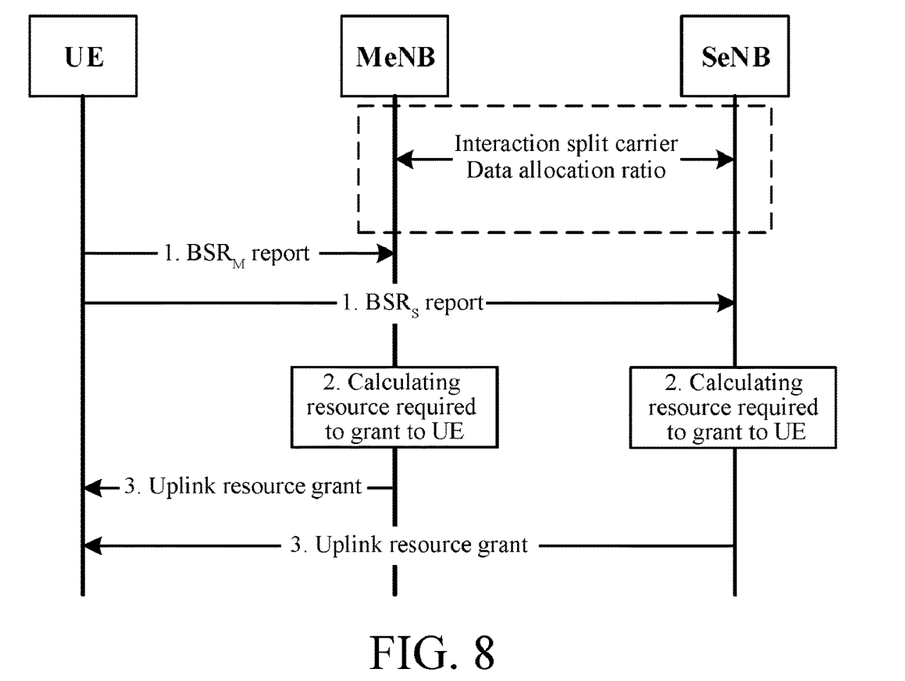
FIG. 8 is a schematic diagram of an uplink resource scheduling flow in the second embodiment according to the present invention.

The UE uplink scheduling flow in the second embodiment is as shown in FIG. 8.

The control node MeNB and the forwarding node SeNB negotiate and interact split bearer data allocation ratios $\lambda_M$ and ($\lambda_M + \lambda_S = 1$).

After respectively receiving the BSR sent from the UE, the control node MeNB and the forwarding node SeNB respectively calculate a resource required to grant to the UE.

According to the BSR reported by the terminal, the control node MeNB knows that the total data size of the data size MCG bearer and the split bearer data size is $D_M$, and the split bearer data ratio is $P_M$.

Similarly, according to the BSR reported by the terminal, the forwarding node SeNB knows that the total data size of the data size SCG bearer and the split bearer data size is $D_S$, and the split bearer data ratio is $P_S$.

Therefore, the control node MeNB and the forwarding node SeNB respectively estimate the split bearer data size, that is, the split bearer data size $S_M=D_M \times P_M$ estimated by the MeNB, the split bearer data size $S_S=D_S \times P_S$ estimated by the SeNB and respective corresponding non-split bearer data $N_M=D_M \times (1-P_M)$ and $N_S=D_S \times (1-P_S)$.

The control node MeNB and the forwarding node SeNB calculates, according to the split bearer data allocation ratios $\lambda_M$ and $\lambda_S$ ($\lambda_M+\lambda_S=1$) determined by the two, the data sizes that the control node MeNB and the forwarding SeNB should bear. In other words, the data size that the control MeNB should bear is the non-split bearer data size $N_M$ born by the MeNB plus the split bearer data size $\lambda_M S_M$ born by the MeNB (namely, $N_M+\lambda_M S_M$). The data size that the control SeNB should bear is the non-split bearer data size $N_S$ born by the SeNB plus the split bearer data size $\lambda_S S_S$ born by the SeNB (namely, $N_S+\lambda_S S_S$).

Finally, the control node MeNB and the forwarding node SeNB respectively perform, according to the calculated data sizes that the MeNB and the SeNB should bear, uplink transmission resource grant on the UE.

In addition, the present invention provides a terminal using the foregoing uplink resource scheduling method. The BSR sent to the base station from the terminal contains split bearer data ratios. The split bearer data ratios can be split bearer data ratios corresponding to logic channel groups one to one.

The invention further provides a base station using the foregoing uplink resource scheduling method, and the base station receives a BSR from the terminal and then calculates the uplink resource required to grant to the terminal. The base station calculates the uplink resource required to grant to the terminal according to the split bearer data ratio and then performs uplink resource grant, wherein the split bearer data ratio is a ratio of a split bearer data size to a total data size to be transmitted, or a ratio of a split bearer data size to a total data size of each logic channel group in the logic channel group.

Preferably, the base station calculates, according to the split bearer data ratio and a split bearer data allocation ratio, the uplink resource required to grant to the grant, the split bearer data allocation ratio is determined by negotiation between the base station and a node capable of transmitting the split bearer data size and is the ratio of the split bearer data size transmitted by the base station to the split bearer data.

According to the present invention, the base station can obtain the split bearer data ratio and the split bearer data allocation ratio. Hence, the base station can calculate the split bearer data size in the total data size to be transmitted according to the split bearer data ratio. The base station can calculate, according to the split bearer data allocation ratio, the split bearer data size that should be transmitted by the base station in the split bearer data size. Thus, the data size should be transmitted by the base station is the non-split bearer data size plus the split bearer data size that should be transmitted by the base station. Therefore, the present invention can be used for precisely calculating the uplink resource required to grant to the terminal by the base station, thus improving a resource use ratio.

The above describes the uplink resource scheduling method, terminal and base station according to the present invention in detail. For A person of ordinary skill in the art performing any obvious change without departing from the essence and spirit of the present invention will violate a patent right of the present invention and should undertake corresponding legal responsibility.

What is claimed is:

1. An uplink resource scheduling method, wherein:
a base station calculates an uplink resource for granting to a terminal according to a split bearer data ratio, and then performs uplink resource granting,
the uplink resource for granting to the terminal is calculated by the following formula:

$G=D \times (1-P)$, if $D \times P \leq r \times t$ wherein G is data size required for the terminal to perform uplink resource granting by the base station; D is total data size to be transmitted by the terminal; P is a split bearer data ratio, r is a WLAN access point service rate,
the split bearer data ratio is a ratio based on a data size transmitted by a split bearer and a non-split bearer.

2. The uplink resource scheduling method according to claim 1, wherein:
the split bearer data ratio is a ratio of a split bearer data size of each logic channel group to a total data size of the logic channel groups.

3. The uplink resource scheduling method according to claim 1, wherein:
the base station calculates uplink resource for granting to the terminal according to the split bearer data ratio and a split bearer data allocation ratio,
the split bearer data allocation ratio is determined by coordination between the base station and a node capable of transmitting the split bearer data size, and is a ratio of a split bearer data size transmitted by the base station to the split bearer data size.

4. The uplink resource scheduling method according to claim 3, wherein:
the split bearer data ratio is determined by the terminal and is sent from the terminal to the base station or the node.

5. The uplink resource scheduling method according to claim 3, wherein:
the uplink resource for granting to the terminal calculated by the base station is a sum of a non-split bearer data size that should be transmitted by the base station, and a product of the split bearer data size and the split bearer data allocation ratio.

6. The uplink resource scheduling method according to claim 1, wherein:
the buffer status report comprises a buffer data size in addition to the split bearer data ratio,
wherein the buffer data sizes represent a data size of logical channel group, total data sizes of logical channel groups, or a data size of each of the logical channel groups.

7. The uplink resource scheduling method according to claim 1, wherein:
the uplink resource for granting to the terminal is calculated by the following formula:

$G=D-r \times t$, if $D \times P > r \times t$ wherein G is data size required for the terminal to perform uplink resource granting by the base station; D is the total data size to be transmitted by the terminal; P is the split bearer data ratio, r is the WLAN access point service rate.

8. A terminal for uplink resource scheduling, wherein:
when the terminal reports a buffer status report to a base station, the buffer status report comprises a split bearer data ratio,
the split bearer data ratio is applied in the following formula for calculating the uplink resource for granting to the terminal:

$G=D \times (1-P)$, if $D \times P \leq r \times t$ wherein G is data size required for the terminal to perform uplink resource granting by the base station; D is total data size to be transmitted by the terminal; P is the split bearer data ratio, r is a WLAN access point service rate, the split bearer data ratio is a ratio based on a data size transmitted by a split bearer and a non-split bearer.

9. The terminal for uplink resource scheduling according to claim 8, wherein:
the buffer status report further comprises a buffer data size that represents a data size of logical channel group, total data sizes of logical channel groups, or a data size of each of the logical channel groups.

10. The terminal for uplink resource scheduling according to claim 8, wherein:
the split bearer data ratio is a ratio of a split bearer data size to the total data size to be transmitted.

11. The terminal for uplink resource scheduling according to claim 8, wherein:
the split bearer data ratio is a ratio of a split bearer data size of each logic channel group to a total data size of the logic channel groups,
the total data size of the logic channel groups includes data size transmitted by a split bearer and a non-split bearer.

12. A base station for uplink resource scheduling, wherein:
the base station calculates an uplink resource for granting to a terminal according to a split bearer data ratio, and then performs uplink resource grant, wherein,
the split bearer data ratio is applied in the following formula for calculating the uplink resource for granting to the terminal:

$$G=D\times(1-P), \text{ if } D\times P \leq r \times t$$

wherein G is data size required for the terminal to perform uplink resource granting by the base station; D is total data size to be transmitted by the terminal; P is the split bearer data ratio, r is a WLAN access point service rate, the split bearer data ratio is a ratio based on a data size transmitted by a split bearer and a non-split bearer.

13. The base station for uplink resource scheduling according to claim 12, wherein:
the base station calculates uplink resource for granting to the terminal according to the split bearer data ratio and a split bearer data allocation ratio, the split bearer data allocation ratio is determined by negotiation between the base station and a node capable of transmitting the split bearer data size, and is a ratio of the split bearer data size transmitted by the base station to the split bearer data size.

14. The base station for uplink resource scheduling according to claim 13, wherein:
the uplink resource for granting to the terminal calculated by the base station is a sum of a non-split bearer data size that should be transmitted by the base station and a product of the split bearer data size and the split bearer data allocation ratio.

15. The base station for uplink resource scheduling according to claim 12, wherein:
the split bearer data ratio is a ratio of a split bearer data size of each logic channel group to a total data size of the logic channel groups.

16. The base station for uplink resource scheduling according to claim 12, wherein:
the uplink resource for granting to the terminal is calculated by the following formula:

$$G=D-r\times t, \text{ if } D\times P > r \times t$$

wherein G is data size required for the terminal to perform uplink resource granting by the base station; D is the total data size to be transmitted by the terminal; P is the split bearer data ratio, r is the WLAN access point service rate.

* * * * *